United States Patent Office 3,462,240
Patented Aug. 19, 1969

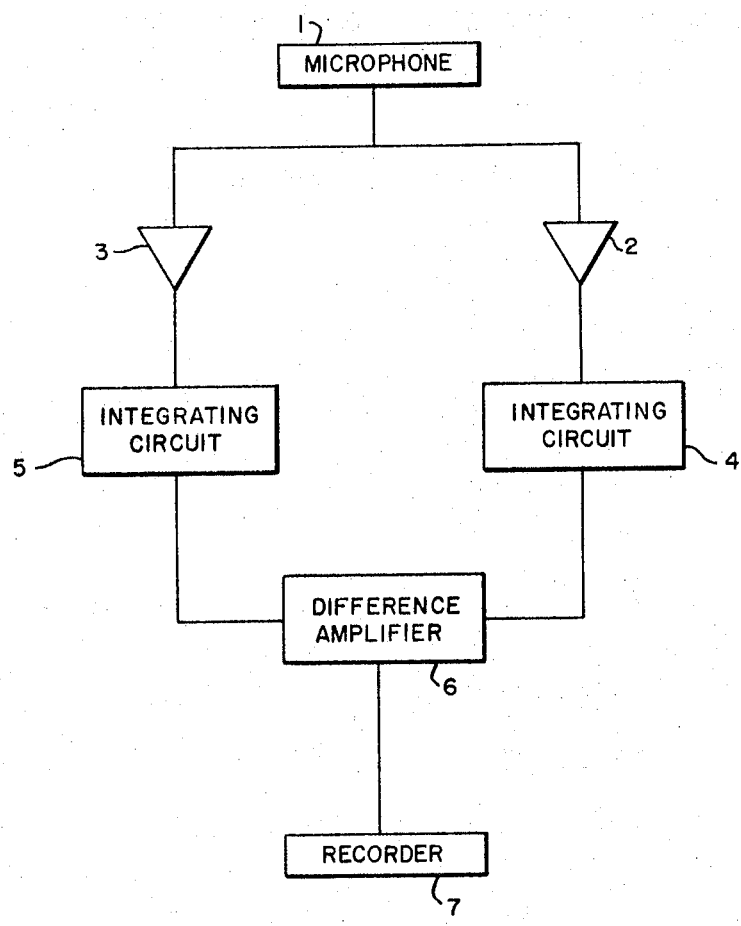

3,462,240
ACOUSTIC APPARATUS FOR EXAMINING A
PIPELINE FOR LEAKS
Hendrik Bosselaar and Arnoldus J. van Riemsdijk, Amsterdam, Netherlands, assignors to Shell Oil Company, New York, N.Y., a corporation of Delaware
Filed June 22, 1967, Ser. No. 648,156
Claims priority, application Netherlands, July 12, 1966, 6609733
Int. Cl. G01m 3/08
U.S. Cl. 73—40.5                                    4 Claims

ABSTRACT OF THE DISCLOSURE

A pipeline leak detector wherein an instrument is transported through the pipeline to detect leaks. The instrument is equipped to detect and amplify acoustic vibrations caused by fluid flowing through both the pipeline and a hole in the pipeline. The detected vibrations are separated into two frequency ranges, one frequency being above the maximum frequency resulting from a leak, the second frequency being set at the maximum frequency resulting from a leak. Any difference between the amplitudes of the two frequencies indicates the presence of a leak.

Cross reference to related applications

This invention is an improvement of the pipeline leak-detecting apparatus disclosed in the copending application of H. Bosselaar and A. J. van Riemsdijk entitled "Apparatus and Process for Detecting and Locating Leaks in Pipelines," Ser. No. 602,628, filed Dec. 19, 1966 now Patent No. 3,409,897.

Background of the invention

Examination of a pipeline for leaks may consist in the observation of the presence or the absence of leaks, in locating a leak, in determining the size of a leak or in combinations thereof.

Prior art devices for examining a pipeline for leaks use equipment that is transported through the pipeline with the flow of fluid through the pipeline. The examination of the pipeline takes place from the inside, while the pipeline continues in operation, which permits cheap and rapid examination in those cases where the pipeline is located in inaccessible areas or is buried.

As described in the copending application, the fluid flowing out of a leak generates acoustic vibrations. In the case of small leaks the frequencies extend from the sonic range into the ultrasonic range. The equipment that is carried through the pipeline detects the vibrations arising from a leak and records the detected signal on a continuous record. More particularly, the system of the copending application detects the peak signal resulting from the leak. The peak signal can be detected if the signal exceeds the background signal level that results from noise in the pipeline. It is therefore necessary that the design of the equipment include provision for increasing the signal-to-noise ratio.

Summary of the invention

According to the present invention this problem is solved by including in the equipment circuits for detecting and processing the acoustic vibrations in two frequency bands, one band lying at or near a maximum in the frequency range of vibrations caused by a leak and the other band lying outside that range in a range of higher frequencies. In order to be able to determine with sufficient certainty whether a detected vibration indeed originates from a leak, the invention records only those signals that exceed a minimum value of the ratio between the signal generated by that leak and the noise present at that moment. The noise is used to describe the sum of all the contributions to the detected signal that do not originate from a leak. The most important contribution to noise originates from background noise in the pipeline. In the copending application the strength of the signal generated by noise is assumed to have a fixed value, but this assumption is in error. For instance, the sound level decreases with decreasing rate of liquid flow. At comparatively low pumping rates the equipment is then adjusted to an unnecessarily high degree of insensitivity.

The apparatus according to the invention eliminates this disadvantage by determining the noise level at the same time that the leak is detected. While the noise is measured in a frequency range other than that where a leak signal shows a maximum, this is not a disadvantage, as it has been found that the intensity of the noise changes gradually as a function of the frequency. The intensity of noise thus measured is a good measure of the intensity of the noise within the frequency range of a leak signal. The noise is measured in a frequency range higher than that of the leak signal, since the frequency spectrum of a leak signal has a clear upper limit in contrast with a wide spectrum of low frequencies. By using high frequencies measurement of the noise can take place in a frequency range close to the frequency range that is used for measurement of the leakage.

A very suitable combination is obtained if one frequency band lies at 43 kHz. and the other at 53 kHz, for it has been found that the amplitude of leak signals shows a sharp decrease in intensity beyond 48 kHz. This is true for leaks of different sizes. An additional advantage of measurements in the ultrasonic range is that the noise level is low.

Brief description of the drawings

The above advantages of this invention will be more easily understood from the following detailed description of a preferred embodiment when taken in conjunction with the attached drawing showing in block diagram form one circuit suitable for carrying out this invention.

Description of preferred embodiment

As described above, the invention utilizes an instrument case or housing that is transported through the pipeline by the fluid flowing in the pipeline. The instrument contains a microphone or similar deivce for detecting vibrations caused by fluid flowing out a leak in the pipeline as well as vibrations resulting from noise generated in the pipeline. The detected vibrations are converted to a related electrical signal that is supplied to two separate amplifying systems. One system has a band pass frequency of approximately 43 kHz., while the other has a band pass of approximately 53 kHz. Both systems are adjusted to substantially the same gain and supply their output signals to a difference-measuring circuit.

By comparing the two measured intensities it is ensured that what is taken into account as the noise level is actually present, resulting in reliable measurement and optimum sensitivity.

During the measurements the following situations may occur:

(a) A leak signal is absent and the two measurements will give little or no difference in intensity.

(b) There is a leak signal and the intensity of the sound will be considerably higher in the low-frequency measuring channel than in the high-frequency measuring channel. As a rule, the intensity of the sound in the high-frequency range will be generated by noise alone.

(c) There is a very strong leak signal and the intensity of the count in the high-frequency measuring channel may contain, in addition to the contribution from noise, also a contribution from the leak signal. As a result of the frequency's increasing by steps, there will occure a marked difference between the two measurements.

Referring now to the enclosed drawing there is shown a circuit in which both frequencies are continuously monitored. The system utilizes a microphone 1 that is sensitive to the higher frequencies at least in the 40 to 60 kHz. band. The microphone is coupled to both band pass amplifiers 2 and 3. One amplifier 2 is adjusted to pass a frequency of 43 kHz., while the second amplifier 3 is adjusted to pass a frequency of 53 kHz. Conventional filter circuits and amplifiers may be substituted in place of the band pass amplifiers 2 and 3. The important feature of the present invention is that the detected signal is separated into two frequency bands, one at 43 kHz. containing both noise and leak signals, the second at 53 kHz. containing only noise.

The two amplifiers 2 and 3 are coupled to integrating circuits 4 and 5. The integrating circuits may be operational amplifiers having a capacitance in their feedback circuit and a resistance in their input circuits. The integrating circuits effect a desired change in relative amplitudes of the two frequency bands or signals by increasing the realtive amplitude of the lower frequencies. As is well known, an integrating circuit produces an output signal whose amplitude or intensity is inversely proportional to frequency. Thus, the low frequency leak signal will be increased in amplitude realtive to the amplitude of the higher frequency noise signal. The two integrating circuits are coupled to the two inputs of a difference amplifier 6. The difference amplifier will subtract the amplitudes of the two signals and supply an output signal equal to the result. In the absence of a leak the result will be zero, while in the presence of a leak, the result will vary with the size of the leak. Other circuits may be substituted for the difference amplifier, for example, a difference voltmeter or the like. The output of the difference amplifier is recorded on a recorder 7 that may be a conventional strip chart recorder. The recorded is diven by a timer so that the record can be correlated with the travel of the instrument through the pipeline.

While the above system was described with the microphone continuously connected to the two amplifiers, alternate arrangements may be used. For example, the microphone may be alternately connected to the two amplifiers. A switching circuit may be used to switch the microphone between the amplifiers a few hundred times per second. Likewise, other recorders may be used, such as a printing-type recorder. This would require the use of additional circuits to convert the signal from the difference amplifier to a numerical value related to its magnitude.

We claim as our invention:
1. An improvement in pipeline leak detectors wherein a housing is transported through a pipeline by fluid flow, said housing containing instrumentation to detect and record acoustic vibrations caused by leaks in the range of 40 to 60 kHz. said improvement comprising:
   a first band pass amplifier, said first band pass amplifier being adjusted to pass a first band lying near the maximum frequency of the vibrations caused by a leak and supply a signal related thereto;
   a second band pass amplifier, said second band pass amplifier being adjusted to pass a second band beyond the maximum frequency range of the vibrations caused by a leak and supply a signal related thereto;
   a difference-measuring means, said first and second band pass amplifiers being coupled to said difference-measuring means; and
   a recording means, said difference-measuring means being coupled to said recording means to record the difference between the signals from said first and second band pass amplifiers.
2. The system of claim 1 in which the first band pass amplifier is adjusted to pass a frequency of 43 kHz. and the second band pass amplifier is adjusted to pass a frequency of 53 kHz.
3. The system of claim 1 including a microphone means disposed to detect the vibrations caused by fluid flowing through a lead, said microphone means being connected to said first and second band pass amplifiers.
4. The system of claim 1 including two integrating circuits, one of said integrating circuits being disposed between each of said band pass amplifiers and said difference-measuring means.

References Cited

UNITED STATES PATENTS

| | | | |
|---|---|---|---|
| 2,884,624 | 4/1959 | Dean et al. | 73—40.5 XR |
| 2,996,613 | 8/1961 | Glomb | 328—165 XR |
| 3,076,939 | 2/1963 | Wycoff | 328—147 XR |
| 3,112,452 | 11/1963 | Kirkpatrick | 330—124 XR |
| 3,126,449 | 3/1964 | Shirman | 328—165 XR |
| 3,192,166 | 6/1965 | Simpkins et al. | 73—40.5 XR |
| 3,268,824 | 8/1966 | Hinrichs et al. | 328—165 |

LOUIS R. PRINCE, Primary Examiner

JEFFREY NOLTON, Assistant Examiner

U.S. Cl. X.R.

328—147, 165